United States Patent [19]
Van Slyke

[11] 3,899,323
[45] Aug. 12, 1975

[54] SILVER RECOVERY PROCESS

[75] Inventor: William Jan Van Slyke, Richland, Wash.

[73] Assignee: Battelle Development Corporation, Richland, Wash.

[22] Filed: Oct. 29, 1973

[21] Appl. No.: 410,920

Related U.S. Application Data

[60] Division of Ser. No. 264,262, June 19, 1972, Pat. No. 3,820,982, which is a continuation of Ser. Nos. 17,507, March 9, 1970, abandoned, Ser. No. 137,219, April 26, 1971, abandoned, and Ser. No. 194,453, Nov. 1, 1971, abandoned, said Ser. No. 194,453, is a continuation-in-part of Ser. No. 17,507, March 9, 1970, abandoned.

[52] U.S. Cl. ................................................. 75/83
[51] Int. Cl.² ........................................ C22B 11/02
[58] Field of Search ................. 75/63, 83; 264/262; 194/453; 137/219

[56] References Cited
UNITED STATES PATENTS

2,944,886   7/1960   Fisher et al. ........................... 75/83
3,632,336   1/1972   Cameron ................................ 75/83

*Primary Examiner*—L. Dewayne Rutledge
*Assistant Examiner*—M. J. Andrews
*Attorney, Agent, or Firm*—Wells, St. John & Roberts

[57] ABSTRACT

Silver-bearing manufactured organic products such as photographic film, photographic paper, printed circuit boards, etc., are loaded into a reduction zone of a retort and pyrolyzed by hot non-oxidizing gases produced by the burning of the carbon residue of previously pyrolyzed organic products in an adjacent oxidation zone in the same retort. The carbon residue is oxidized by subjecting the residue to a heated air and water vapor mixture. The rate of pyrolyzation is controlled so that the film entering the retort is contacted by non-oxidizing gases and vapors having a temperature less than 200° C. The off-gases of the pyrolysis are burned to heat the air and water vapor mixture.

11 Claims, 1 Drawing Figure

PATENTED AUG 12 1975   3,899,323
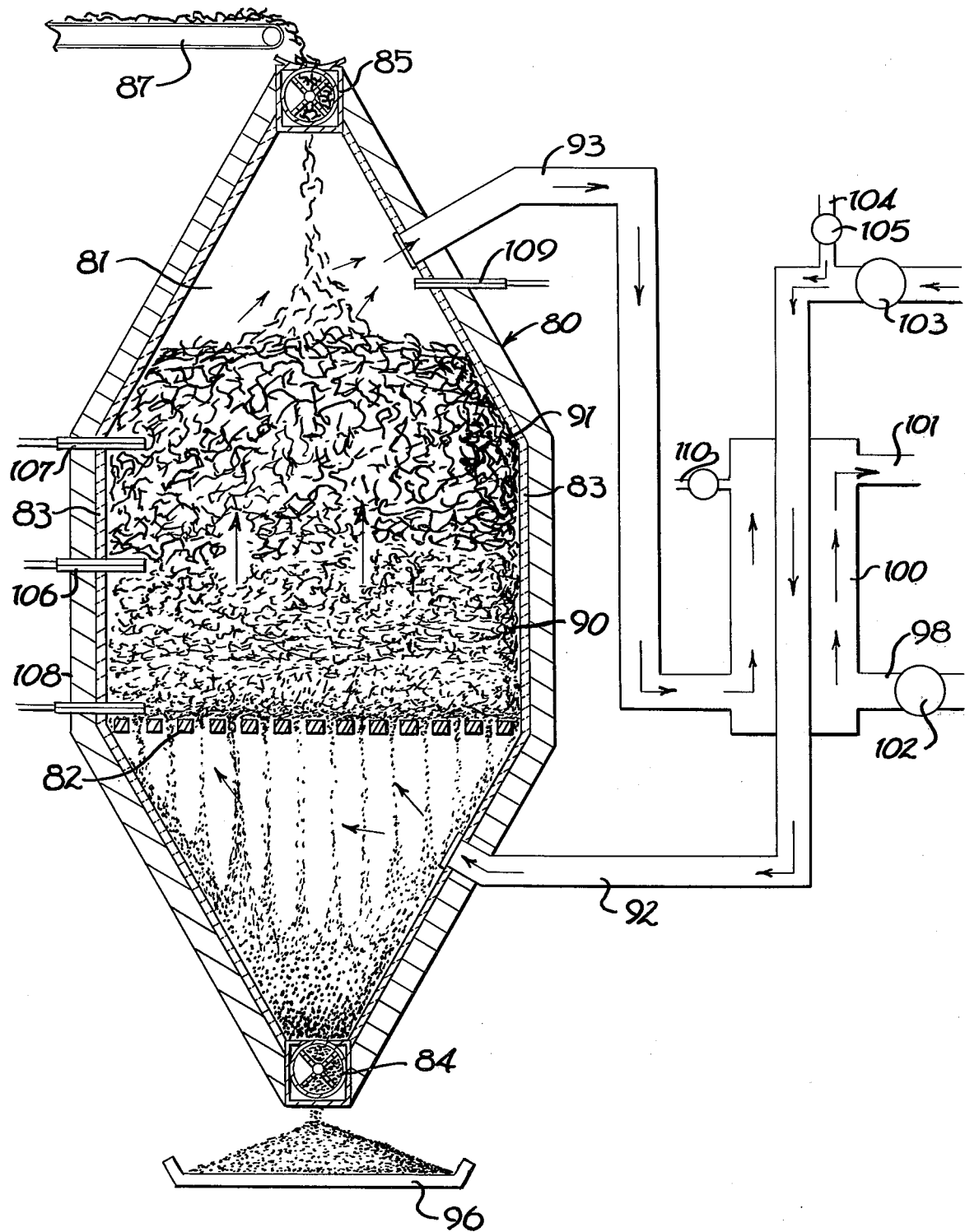

SILVER RECOVERY PROCESS

RELATED APPLICATIONS

This application is a divisional application of a copending U.S. application Ser. No. 264,262 filed June 19, 1972, now U.S. Pat. No. 3,820,982. Application Ser. No. 264,262 is a consolidated continuation application of three copending (now abandoned) applications — Ser. No. 17,507 filed Mar. 9, 1970; Ser. No. 137,219 filed Apr. 26, 1971; and Ser. No. 194,453 filed Nov. 1, 1971. Application Ser. No. 194,453 is a continuation-in-part of application Ser. No. 17,507.

BACKGROUND OF THE INVENTION

This invention relates to processes for recovering silver and more particularly to pyrometallurgical processes for treating used silver-bearing manufactured organic products to recover the silver therefrom.

Although it has been readily appreciated that used manufactured products such as photographic films and papers and several types of printed circuit boards contain appreciable amounts of silver, such products are frequently discarded because of the lack of adequate methods and processes for economically recovering the silver.

Over the years, the two processes most utilized have been (1) a hypo process involving the treatment of the film in a hypo solution and (2) burning or combustion process in which the material is burned in an open vessel to form an ash. The hypo process is quite expensive and is used almost exclusively in treating X-ray film. The burning process has several disadvantages which include the creation of a substantial air pollution problem and a substantial loss of silver in the flue gases that escape into the atmosphere.

This requires that such a burning process be conducted away from populated centers. A refinement of the combustion process is described in U.S. Pat. No. 2,944,886 in which water is sprayed onto the burning film to reduce the loss of silver in the flue gas. However, the process is only partially satisfactory. U.S. Pat. No. 3,632,336 granted Jan. 4, 1972 describes a pyrolyzation process for reducing the film to a carbon residue with a non-oxidizing atmosphere such as superheated steam.

One of the principal objects of this invention is to provide a pyrometallurgical process for recovering the silver without the normally associated air pollution problems and without loss of the silver in the flue gases.

An additional object of this invention is to provide a pyrometallurgical process that is both self-sustaining and easily controllable.

A further object is to provide a process that can be operated on a continuous basis.

An additional object of this invention is to provide a pyrometallurgical process for recovering silver from photographic film and the like in which the flue gases emitted to the atmosphere are limited almost entirely to carbon dioxide, nitrogen and water vapor.

A further object of this invention is to provide an efficient counter-current process with the silver-bearing materials flowing in one direction and the conditioning and reaction gases flowing in the opposite direction.

An additional object of this invention is to provide a pyrometallurgical process in which the combustion heat value of the process off-gas is utilized for heating the starting elements.

A still further object of this invention is to provide an efficient high production pyrometallurgical process that requires a relatively small retort in which to carry out several of the steps.

An additional object of this invention is to provide an improved pyrolyzation process for recovering silver in comparison to the pyrolyzation process described in U.S. Pat. No. 3,632,336 granted Jan. 4, 1972.

These and other objects and advantages are accomplished by sequentially heating, pyrolyzing and oxidizing the silver-bearing manufactured organic products such as photographic film to progressively reduce the product to a silver-bearing ash and produce a pyrolytic offgas mixture having a temperature of less than 200° C. The silver-bearing ash is treated to separate the ash and silver to recover the silver. The film is fed onto a thick bed in an enclosed retort. The film progressively descends in the bed. Initially, the film is heated to a temperature below its pyrolyzation temperature. As the heated film descends it is heated further in a hot non-oxidizing atmosphere to pyrolyze the film to form a silver-bearing carbon residue and pyrolytic off gases. The silver-bearing carbon residue descends further and is contacted with a preheated air/oxygen and water vapor mixture of sufficient temperature and mixture ratio to burn the carbon residue to form the silver-bearing ash and produce hot non-oxidizing gases. The hot non-oxidizing gases are directed upward through the film to create the hot non-oxidizing atmosphere to cause pyrolyzation of the film. The pyrolytic off-gases are removed from the retort at a temperature less than 200° C. and are subsequently burned to preheat the air and water vapor mixture. The rate of gaseous flow, a temperature of the preheated air and water vapor mixture and the ratio of water vapor to oxygen are controlled to maintain the pyrolytic off-gas mixture temperature leaving the top layer of the bed below 200° C.

BRIEF DESCRIPTION OF THE DRAWINGS

The accompanying drawing illustrates schematically apparatus and flow patterns for carrying out a preferred embodiment of this process invention.

DETAILED DESCRIPTION OF A PREFERRED EMBODIMENT

Photographic Film

This process is accomplished by sequentially heating, pyrolyzing and oxidizing the silver-bearing photographic film to progressively reduce the film to a silver-bearing ash and produce a pyrolytic off-gas mixture having a temperature of less than 200° C. The silver-bearing ash is treated to separate the ash and silver to recover the silver. The film is fed onto a thick bed in the enclosed retort. The film progressively descends in the bed. Initially, the film is heated to a temperature below its pyrolyzation temperature. As the heated film descends it is heated further in the hot non-oxidizing atmosphere to pyrolyze the film to form a silver-bearing carbon residue and pyrolytic off-gases. The silver-bearing carbon residue descends further and is contacted with the preheated air/oxygen and water vapor mixture of sufficient temperature and mixture ratio to burn the carbon residue to form the silver-bearing ash and produce hot non-oxidizing gases. The hot non-oxidizing gases are directed upward through the film to create the hot non-oxidizing atmosphere to cause pyrolyzation of the film. The pyrolytic off-gases are removed from the retort at a temperature less than 200° C. and are subsequently burned to preheat the air and water vapor mixture. The rate of gaseous flow, a temperature of the preheated air and water vapor mixture and the ratio of water vapor to oxygen are controlled to maintain the pyrolytic off-gas mixture temperature leaving the top layer of the bed below 200° C.

The process and apparatus, illustrated in the drawing are designed to feed the used photographic film into an enclosed retort 80.

The retort 80 is substantially upright having a lined chamber 81 with a grate 82 located near the lower end thereof for supporting solid materials. The side walls 83 of the retort are substantially vertical to direct the film downward toward the grate 82 and the lower end. A solid particle removal means 84 is located at the lower end of the retort for removing solid particles without admitting air. Such a device is frequently referred to as a rotary air-lock valve. A similar means 85 is located at the upper end of the retort for feeding the silver-bearing film into the chamber without admitting air. A conveyor 87 is shown for feeding the film to the retort on a continuous or intermittent basis.

The chamber 81 has two reaction zones above the grate — an oxidation zone 90 and a reduction zone 91 — with the reduction zone 91 being contiguous and immediately above the oxidation zone 90. A gas input line 92 extends into the retort at the oxidation zone or below the grate. In the accompanying drawing the line 92 is shown extending into the retort below the grate. An off-gas line 93 extends from the retort above the reduction zone for removing the product off-gases produced by pyrolytic decomposition of the film.

The process and apparatus illustrated in the drawing are designed to provide a continuous countercurrent operation with photographic film being fed into the retort above or at the reduction zone and flowing downward as the decomposition proceeds through the reduction and oxidation zones and being removed in the form of a silver-bearing ash at the bottom. In the reduction zone the film is progressively heated and pyrolyzed to form a silver-bearing carbon residue and pyrolytic off-gas mixture. Initially, the film is fed through means 85 onto the top surface of a thick bed of previously fed film at the reduction zone 91. In the reduction zone 91 the film is first subjected to a non-oxidizing atmosphere having a temperature of between 100° and 200° C. to progressively heat the newly fed film and evaporate any moisture therefrom without initially pyrolyzing the film. As the film bed descends in the reduction zone, the film is progressively subjected to hotter non-oxidizing atmosphere to progressively pyrolyze the film in the reduction zone. The temperature of the reduction zone 91 ranges from 400° to 800° C. at the bottom of the reduction zone, to 100° to 200° C. at the top of the reduction zone. Preferably, the progressive heating and pyrolyzing of the film is accomplished by passing a hot non-oxidizing gaseous mixture upward through the bed of film with the heat content of the gaseous mixture being progressively transferred to the film to heat and pyrolyze the film. The film begins to pyrolyze at about 225° C. and is substantially fully pyrolyzed as it passes from the reduction zone to the oxidation zone. As the pyrolyzation takes place, the volume of this film material decreases causing the material to move downwardly by gravity. The pyrolytic offgas mixture flows out the line 93 at a temperature below 200° C. and preferably between 100° and 200° C. and the silver-bearing carbon residue is directed downward by the side walls and settles by gravity into the oxidation zone.

In the oxidation zone the silver-bearing carbon residue is burned in an oxidizing atmosphere to further decompose the silver-bearing carbon residue into a silver-bearing ash material and produce the hot non-oxidizing gases that flow upwards into the reduction zone to pyrolyze and heat the film.

The burning is accomplished by directing a preheated air (containing free oxygen) and water vapor mixture through the line 92 and into the retort of a sufficient temperature and mixture ratio to burn the silver-bearing carbon residue. The resulting silver-bearing ash drops through the grate and is removed from the retort through the removal means 84. A receiving container 96 is positioned below the retort to catch the ash. The ash is subsequently processed to separate the silver from the ash by conventional flux or flotation process or by new processes that may be devised in the future to recover the silver.

In the oxidation zone the preheated air (free oxygen) and water vapor react with the carbon to reduce the carbon to an ash and consuming the oxygen from the air to produce an evolved hot non-oxidizing gas mixture consisting principally of hydrogen, carbon monoxide, carbon dioxide, of volatile and water vapor of sufficient temperature to pyrolyze the film and insufficient to sinter the ash. The hydrogen will react with any silver salts that are present to reduce the salt to metal silver. If the silver salt content is substantial it may be desirable to add an alkali metal carbonate, such as sodium carbonate, to reduce the formation of volatile mineral acids.

The hot non-oxidizing gas mixture flows upward from the oxidation zone through the film in the reduction zone to provide the hot non-oxidizing atmosphere necessary for the decomposing of the film by breaking down the high molecular weight organic compounds such as cellulose nitrate, cellulose acetate and other film backing material to volatile low molecular weight constituents such as acetone, acetic acid, hydrogen, methane, carbon dioxide and carbon monoxide. The silver-bearing carbon residue naturally settles by gravity to the oxidation zone as the ash material falls through the grate. Approximately 25 pounds of silver-bearing carbon residue is formed for every 100 pounds of film processed.

The pyrolytic off-gas mixture is utilized to preheat the air and water vapor (steam) to a temperature between 300° and 800° C. before it reaches the retort. The preheating is accomplished by adding oxygen or air through line 98 to the pyrolytic or process off-gas mixture to burn the combustible gases present to provide a very hot gaseous product of nitrogen, carbon dioxide and water vapor of approximately 2,500° F. The hot gaseous product is passed through a heat exchanger or chamber 100 that transfers the heat to line 92 and to the air and water vapor that flows therethrough. The hot combustion gaseous product is then emitted to the atmosphere through line 101 with no accompanying soot or smoke. The amount of air combined with the pyrolytic off-gases is controlled by valve 102. Excess air may be admitted to regulate the temperature of the gaseous product.

The basic input reactive agents added to the retort to decompose the film are water vapor and oxygen. The oxygen can be added in the form of air, enriched air or as relatively pure oxygen. The overall rate of oxidation is determined by the rate of addition of the preheated oxygen and water vapor. The oxidation equilibrium temperature is principally determined by the concentration and preheat temperatures of the oxygen and water vapor entering the retort. Under some circumstances it may be desirable to add inert gases with the oxygen and water vapor.

The ratio of oxygen to water vapor added to the oxidation zone should be maintained to keep the temperature of the silver-bearing carbon residue bed in the oxidation zone between 500° and 800° C. and preferably at approximately 700° C. and to keep the temperature of the process off-gases leaving the retort through line 93 less than 200° C. and preferably between 100° and 200° C. It is very important that the entering film be subjected to a nonoxidizing atmosphere having a temperature below film pyrolytic temperature to allow the film to be first heated before pyrolyzation to prevent solid particle entrainment in the pyrolytic off-gas flow.

The amount of air flowing through line 92 is controlled by valve 103. Water or steam is admitted to line 92 through line 104. Valve 105 controls the amount of water mixed with the air to provide a means of regulating the oxidizing and pyrolyzing temperatures of the film material during constant flow rate conditions.

To obtain the desired bed temperature and control the rate of pyrolyzation to prevent loss of silver, the inlet temperature of the preheated air and water vapor mixture should be maintained between 350° and 800° C. and the water vapor to air ratio should be between 0.135 and 0.575. For optimum efficiency the inlet temperature utilizing an air and water vapor mixture should be approximately 500° C. with a volume ratio of approximately 0.47 of water vapor to air. When photographic film having little or no silver salts is processed, non-oxidizing gases are produced in the oxidizing zone from the air and water vapor mixture in the following approximate proportions by volume: $H_2O$ — 3 percent; $CO_2$ — 7 percent; $CO$ — 28 percent; $H_2$ — 20 percent and $N_2$ — 42 percent.

It is also very important that the effective flow of the gases and vapors upward through the solid material be sufficient to sustain the reactions but insufficient to "float" or entrain the solid particles therein. It has been found that the gases flow rate in the retort should be less than 0.45 feet per second (superficial velocity) based upon the actual volumetric flow rate of the entering gases (water vapor, oxygen/air and inert gases). Superficial velocity is defined as the linear flow rate assuming the retort to be empty based upon volumetric rate of gases passing through the retort. This means that the volumetric rate of entering gases and vapors through line 92 should correspond to a superficial velocity linear flow rate in the retort of less than 0.45 feet per second. The oxidation temperature may be varied within the required range to adjust for varying types of film and moisture content. As previously mentioned, the oxygen and water vapor reacts with the silver-bearing carbon residue to form the hot non-oxidizing gaseous fluid of carbon monoxide, carbon dioxide and hydrogen of sufficient temperature to pyrolyze the film material in the reduction zone. The hot non-oxidizing gaseous fluid flows upward from the oxidation zone into the reduction zone to contact the heated film material. As the pyrolysis proceeds, the heat content is removed from the hot non-oxidizing gases to reduce the film material to a silver-bearing carbon residue and produce pyrolysis off-gases and vapors. Depending upon the composition of the film and the rate of pyrolysis, varying amounts of carbon monoxide, carbon dioxide, hydrogen, water vapor and hydrocarbon vapors are produced. The pyrolysis off-gases and vapors are mixed with the non-oxidizing gaseous fluid from the oxidizing zone to form a combined non-oxidizing gaseous medium that passes upward at a reduced temperature to heat the entering film and pass out line 93. It is very important that the entering film be contacted with the non-oxidizing gaseous medium having a temperature sufficient to evaporate any moisture but insufficient to pyrolyze the film. Preferably, the entering film should be contacted with the non-oxidizing gaseous fluid at a temperature of between 100° and 200° C.

Considered in another view, the silver-bearing solid material moves down slowly through the retort by the settling of the thick bed and the non-oxidizing gaseous fluid, produced by burning the carbon having an initial temperature of between 500° and 800° C., is filtered slowly up through the descending solid material with the temperature of the non-oxidizing gaseous fluid progressively decreasing as the fluid moves upward and the temperature of the solid material progressively increasing as it moves downward. The initial temperature of the non-oxidizing gaseous fluid is controlled by controlling the oxidation rate and temperature so that the temperature of the non-oxidizing gaseous fluid as it passes through the silver-bearing solid material decreases below the pyrolyzation temperature of the film material before it reaches the top surface of the bed or pile. In this manner, the entering film material is preheated and dried at an elevated temperature below the pyrolyzation temperature of the film material.

It is desirable to maintain the pressure in the retort at atmospheric, or slightly above atmospheric pressure to provide an even flow of gases and vapors therethrough.

Temperature sensing devices are mounted in the retort to monitor the progress of the process. The sensors are operatively connected to valves 103 and 105 to adjust and control the flow rates and ratios of oxygen and water vapor. A sensing device 109 is mounted in the retort adjacent to the off-gas line 93 to sense and monitor the temperature of the pyrolytic off-gases as they leave the retort. The process is controlled and regulated to maintain the temperature sensed by device 109 less than 200° C.

Thermocouples 106, 107 and 108, extend into the chamber 81 to measure the temperature of the processed material during its flow through the retort. Thermocouple 108 is located adjacent the grate to measure the bed temperature of the carbon residue. Thermocouple 106 is located in the interface between the oxidizing zone and the reduction zone. Thermocouple 107 extends into the reduction zone near the top thereof. Between the measurements of the thermocouple 106 and 107, a good indication can be obtained as to the rate of pyrolysis taking place in the reduction zone. It is desirable to have the temperature vary in the bed from 700° C. at the bottom of zone 91 to less than 200° C. near the top of the reduction zone to provide a smooth pyrolytic reaction without loss of silver in the off-gases.

Although there are several methods of initially starting the process, one of the preferable methods is to initially place a carbonaceous material in the oxidizing zone and then load the film on top in the reduction zone. A combustible fuel such as natural gas is injected into the chamber 100 through line 110 and ignited with air from line 98 to heat the air and water vapor mixture sufficiently to burn the carbonaceous material. Hot gases from the carbonaceous material pyrolyze the film to reduce the film to a silver-bearing carbon residue and produce the desired off-gases. The valve 110 is then closed enabling the process to be self-sustaining with the addition of the air through line 98. As the process proceeds, the grate 82 may be vibrated or opened and closed periodically or continuously to assist in the flow of the solids through the zones.

It should be understood that the above described embodiments of this invention are merely illustrative of the principals of this invention and that numerous alternative embodiments can be devised by persons skilled in the art which incorporate said principals. Therefore, only the following claims are intended to define this invention.

What is claimed is:
1. A process for recovering silver from silver-bearing photographic film containing silver salts comprising the steps of:
   a. subjecting the photographic film to hot nonoxidizing gases to prolyze the photographic film to form a silver-bearing carbon residue and a pyrolytic off-gas mixture said hot nonoxidizing gases being a gaseous mixture containing sufficient hydrogen to reduce silver salts to metallic silver;
   b. burning the silver-bearing carbon residue in an oxidizing atmmosphere of a heated air and water vapor mixture of a sufficient temperature and ratio to burn the residue to form a silver-bearing ash and produce said hot nonoxidizing gases;
   c. directing said nonoxidizing gases to the photographic film to perform step (a); and
   d. separating the silver from the ash to recover the silver.

2. The silver recovery process as defined in claim 1 further comprising the step of utilizing the off-gas mixture to heat the air and water vapor mixture.

3. The silver recovery process as defined in claim 1 wherein the off-gas mixture is burned to produce a hot gaseous product for heating the air and water vapor mixture.

4. The silver recovery process as defined in claim 1 wherein the water vapor to air ratio and temperature of the air and water vapor mixture is sufficient to maintain the bed temperature of the burning silver-bearing carbon residue at approximately 700° C.

5. A pyrometallurgical process for recovering silver from silver-bearing photographic film containing silver salts comprising the steps of:
   a. feeding said photographic film into a reduction zone of an enclosed retort;
   b. subjecting said photographic film to hot nonoxidizing gases of sufficient ternperature to pyrolyze the photographic film to form a silver-bearing carbon residue and an off-gas mixture, said hot nonoxidizing gases being a gaseous mixture containing sufficient hydrogen to reduce silver salts to metallic silver;
   c. directing the silver-bearing carbon residue to an oxidizing zone of the retort;
   d. burning the silver-bearing carbon residue in an oxidizing atmosphere of a heated air and water vapor mixture of a sufficient temperature to reduce the residue to form a silver-bearing ash and said hot nonoxidizing gases of the sufficient temperature;
   e. directing the hot nonoxidizing gases from the oxidizing zone to the reduction zone to perform step (b);
   f. removing the silver-bearing ash from the retort; and
   g. separating the silver from the ash to recover the silver.

6. In a process for recovering silver from silver-bearing photographic film containing silver salts;
   preheating an oxygen and water vapor mixture to a temperature sufficient to burn a carbonaceous material to produce hot substantially oxygen free gases;
   contacting the carbonaceous material with the preheated oxygen and water vapor mixture to burn the carbonaceous material to form an ash and the hot substantially oxygen-free gases; and
   contacting the silver-bearing photographic film with the hot substantially oxygen free gases to pyrolyze the silver-bearing photographic film to form a silver-bearing carbon residue and pyrolytic off-gases, said hot substantially oxygen free gases being a gaseous mixture containing sufficient hydrogen to reduce silver salts to metallic silver.

7. In a process for recovering silver from silver-bearing photographic film material, comprising the steps of:
   moving photographic film material fed from an entrance through an enclosed retort;
   passing a hot non-oxidizing gaseous fluid through the photographic film material countercurrent to the movement of the photographic film material to progressively heat, and pyrolyze the photographic film material as the organic refuse moves through the retort to reduce the photographic film material to a silver-bearing carbon residue; and
   controlling the initial temperature and flow rate of the non-oxidizing gaseous fluid so that the temperature of the non-oxidizing gaseous fluid will progressively decrease from an initial temperature of between 500° and 800° C. as the non-oxidizing gaseous medium passes through the photographic film material to a temperature contacting the entering photographic film material of less than 200° C.

8. In the silver recovery process according to claim 7 wherein the flow rate of the non-oxidizing gaseous fluid through the photographic film material is equivalent to a superficial velocity of less than 0.45 ft. per second.

9. In the silver recovery process according to claim 7 further comprising the step of:
   feeding an oxidizing gaseous fluid into the retort downstream of the entrance to contact the silver-bearing carbon residue and reduce the silver-bearing carbon residue to a silver-bearing ash residue and produce said non-oxidizing gaseous fluid which is passed countercurrent through the photographic film material.

10. In the silver recovery process according to claim 9 wherein the oxidizing gaseous fluid contains free oxygen and water and wherein the initial temperature and flow rate of the non-oxidizing gaseous fluid is controlled by controlling the flow rate and free oxygen and water vapor content of the oxidizing gaseous fluid and thereby control the rate and temperature of silver-bearing carbon residue oxidation.

11. In the silver recovery process according to claim 10, further comprising the step of preheating the oxidizing gaseous fluid to a temperature between 300° and 800°C. before contacting the silver-bearing carbon residue.

* * * * *